(12) United States Patent
Safavi et al.

(10) Patent No.: US 10,439,684 B2
(45) Date of Patent: Oct. 8, 2019

(54) SMART ANTENNA PLATFORM FOR INDOOR WIRELESS LOCAL AREA NETWORKS

(71) Applicant: Futurewei Technologies, Inc., Plano, TX (US)

(72) Inventors: Saeid Safavi, San Diego, CA (US); Dedi D. Haziza, Los Gatos, CA (US)

(73) Assignee: FUTUREWEI TECHNOLOGIES, INC., Plano, TX (US)

(*) Notice: Subject to any disclaimer, the term of this patent is extended or adjusted under 35 U.S.C. 154(b) by 1286 days.

(21) Appl. No.: 13/731,899

(22) Filed: Dec. 31, 2012

(65) Prior Publication Data

US 2014/0187174 A1    Jul. 3, 2014

(51) Int. Cl.
| | | |
|---|---|---|
| H04B 7/0404 | (2017.01) |
| H01Q 3/24 | (2006.01) |
| H04B 7/0413 | (2017.01) |
| H04B 7/06 | (2006.01) |
| H04B 7/10 | (2017.01) |
| H01Q 1/24 | (2006.01) |
| H01Q 19/10 | (2006.01) |
| H01Q 21/20 | (2006.01) |

(52) U.S. Cl.
CPC ........... *H04B 7/0404* (2013.01); *H01Q 1/246* (2013.01); *H01Q 3/24* (2013.01); *H01Q 19/106* (2013.01); *H01Q 21/205* (2013.01); *H04B 7/0413* (2013.01); *H04B 7/0617* (2013.01); *H04B 7/0689* (2013.01); *H04B 7/10* (2013.01)

(58) Field of Classification Search
USPC ................. 343/876, 853, 836; 342/374
See application file for complete search history.

(56) References Cited

U.S. PATENT DOCUMENTS

| | | | | |
|---|---|---|---|---|
| 4,101,836 A | * | 7/1978 | Craig | H04B 7/0808 455/277.1 |
| 4,101,901 A | | 7/1978 | Kommrusch | |
| 4,213,132 A | * | 7/1980 | Davidson | H01Q 25/00 342/350 |

(Continued)

FOREIGN PATENT DOCUMENTS

| | | |
|---|---|---|
| CN | 101729111 A | 6/2010 |
| CN | 101895327 A | 11/2010 |

(Continued)

OTHER PUBLICATIONS

"Wireless Arrays," Xirrus, http://www.xirrus.com/Products/Wireless-Arrays.aspx, downloaded from the Internet Nov. 7, 2012, 2 pages.

(Continued)

*Primary Examiner* — Yuwen Pan
*Assistant Examiner* — Erica L Fleming-Hall
(74) *Attorney, Agent, or Firm* — FutureWei Technologies, Inc.

(57) ABSTRACT

An apparatus comprising a first dipole antenna, a beamforming antenna array (BFAA), a first switch coupled to the dipole antenna, a second switch coupled to the BFAA, and a processor coupled to the first switch and the second switch, wherein the processor is configured to select between a multi-input, multi-output (MIMO) antenna configuration and a beamforming configuration by setting the states of the first switch and the second switch.

18 Claims, 7 Drawing Sheets

(56) References Cited

U.S. PATENT DOCUMENTS

| | | | | |
|---|---|---|---|---|
| 4,924,235 | A * | 5/1990 | Fujisaka | G01S 13/42 342/158 |
| 5,434,575 | A * | 7/1995 | Jelinek | H01Q 21/062 342/365 |
| 5,457,465 | A * | 10/1995 | Collier | H01Q 21/061 342/374 |
| 5,610,617 | A * | 3/1997 | Gans | H01Q 3/24 342/148 |
| 6,735,182 | B1 * | 5/2004 | Nishimori | H01Q 3/26 342/372 |
| 7,545,321 | B2 * | 6/2009 | Kawasaki | H01Q 3/267 342/174 |
| 7,574,236 | B1 * | 8/2009 | Mansour | H04B 7/0413 455/562.1 |
| 2008/0291088 | A1 * | 11/2008 | Nagai | G01S 13/34 342/374 |
| 2009/0081965 | A1 * | 3/2009 | Erceg | H01Q 9/16 455/90.2 |
| 2010/0296419 | A1 * | 11/2010 | Kim | H04B 1/0064 370/297 |
| 2011/0134972 | A1 * | 6/2011 | Zhu | H01Q 1/246 375/219 |
| 2011/0163610 | A1 * | 7/2011 | Gilbert | H02J 17/00 307/104 |

FOREIGN PATENT DOCUMENTS

| | | |
|---|---|---|
| EP | 2424125 A1 | 2/2012 |
| WO | 2010/088721 A1 | 8/2010 |

OTHER PUBLICATIONS

"Marketing v. Reality in Multi-Antenna Wi-Fi A Back-to-the-Basics Guide to 802.11 Beamforming for Discerning Buyers," White Paper, Ruckus Wireless, 2011, 14 pages.

Haziza, D. D., U.S. Appl. No. 13/708,554; Title: "Beam Forming Antenna Array,"Filing Date: Dec. 7, 2012; Specification 17 pages; 6 Drawing Sheets (Figs. 1-10).

Safavi, S., U.S. Appl. No. 13/712,545; Title: "Method and Apparatus for Combined Adaptive Beamforming and MIMO in Indoor Wireless LAN," Filing Date: Dec. 12, 2012; Specification 20 pages; 4 Drawing Sheets (Figs. 1-5).

Partial English Translation and Abstract of Chinese Patent Application No. CN101729111A, dated Jun. 20, 2014, 4 pages.

Foreign Communication From a Counterpart Application, PCT Application No. PCT/CN2013/091046, International Search Report dated Mar. 20, 2014, 6 pages.

Foreign Communication From a Counterpart Application, PCT Application No. PCT/CN2013/091046, Written Opinion dated Mar. 20, 2014, 5 pages.

"Part 11: Wireless LAN Medium Access Control (MAC) and Physical Layer (PHY) Specifications, Amendment 5: Enhancements for Higher Throughput," IEEE, 802.11n, Oct. 29, 2009, 536 pages.

"Part 11: Wireless LAN Medium Access Control (MAC) and Physical Layer (PHY) Specifications, Amendment 4: Enhancements for Very High Throughput for Operation in Bands below 6 GHz," IEEE, P802.11ac/D7.0, Sep. 2013, 456 pages.

* cited by examiner

SMART ANTENNA PLATFORM FOR INDOOR WIRELESS LOCAL AREA NETWORKS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

As wireless local area network (WLAN) and WiFi technologies evolve, the demand increases to support a higher capacity (e.g., more users) while maintaining throughput and quality of service (QoS). Additionally, as the number of users and user terminals increases the hostility of the transmission environment may also increase, which may result in more interference, spectral inefficiencies, and lower data throughput for individual users. For example, in a multi-user broadband wireless (e.g., WiFi) environment (e.g., a business center, an office, a hotel, a hospital, etc.), each user may act as a source of noise (e.g., interference) for other users in a conventional WLAN comprising an omnidirectional antenna system. In such an example, data throughput for each user may be reduced because of interference effect. Additionally, due to spectral inefficiencies and bandwidth limitations the data throughput for each user may be further reduced.

Conventional WLAN devices, systems, and methods may employ a beamforming antenna system to improve the efficiency (e.g., spectral efficiency, data throughput, etc.) of the system and to alleviate the hostility of the transmission environment. For example, a beamforming antenna system may be employed to direct and/or to focus an antenna radio frequency (RF) pattern towards one or more specific users. Conventional beamforming approaches are often complex, large, and inefficient in most indoor environments. For example, conventional WLAN devices, system, and methods comprising a beamforming antenna system may require designing directive antenna elements and/or comprise one or more active circuits (e.g., amplifiers, phase shifting circuits, etc.). As such, devices, systems, and methods for more efficiently providing the ability to adjust and/or to steer an antenna RF pattern towards one or more target users are needed.

Further, multiple-input multiple-output (MIMO) antennas and related signal processing have become important technologies in increasing data rates in indoor wireless systems. In future systems it may be useful to be able to quickly and efficiently switch between MIMO antennas and beamforming antennas to be able to adapt to changing channel conditions and interference patterns. There is thus a need for an antenna platform for providing the benefits of both MIMO antennas and beamforming antennas.

SUMMARY

In one embodiment the disclosure includes an apparatus comprising a first dipole antenna, a beamforming antenna array (BFAA), a first switch coupled to the dipole antenna, a second switch coupled to the BFAA, and a processor coupled to the first switch and the second switch, wherein the processor is configured to select between a MIMO antenna configuration and a beamforming configuration by setting the states of the first switch and the second switch.

In another embodiment, the disclosure includes a method comprising identifying a target user device, determining whether to use a beamforming or MIMO configuration, activating one or more antennas from among a dipole antenna and a BFAA according to the determined configuration, communicating with the target user device by transmitting data using the beamforming or MIMO configuration.

In yet another embodiment, the disclosure includes a wireless communication device comprising an antenna platform comprising a dipole antenna, a first BFAA, and a second BFAA, a transceiver coupled to the antenna platform, and a processor coupled to the transceiver, wherein the processor is configured to select a beamforming configuration or a MIMO configuration of the antenna platform, and control the transceiver such that the antenna platform has the selected configuration.

BRIEF DESCRIPTION OF THE DRAWINGS

For a more complete understanding of this disclosure, reference is now made to the following brief description, taken in connection with the accompanying drawings and detailed descriptions, wherein like reference numerals represent like parts.

DETAILED DESCRIPTION OF THE EMBODIMENTS

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Many conventional communication systems adopt either a beamforming or a MIMO approach but without sufficient capability to switch between the two approaches. Beamforming may not perform well in a multipath environment. For example, multipath effects and obstructions may significantly degrade a generated beam thereby causing huge losses in indoor environments.

MIMO may be introduced as an alternative to beamforming, but MIMO approaches have drawbacks in certain environments. For example, MIMO systems and in particular those based on spatial multiplexing may lose much of their effectiveness when high levels of interference are present. Addressing interference issues in MIMO may be a complicated task. Traditional interference management techniques may have limited usefulness (sometimes are even counter-productive) when viewed within the context of MIMO. More specifically, the problem of interference in MIMO may require a combination of techniques (too large of a problem to be handled by a single technique) which may demand extensive research study and analysis. Further, MIMO systems may lose their gain very rapidly when moving away from the transmitter, for example, due to channel state information or indications (CSI) degradation and the nature of multipath.

To address shortcomings of beamforming, implicit and explicit digital beamformings were introduced by 802.11.n and 802.11ac standards. Several studies in indoor environments show that both analog and digital beamforming may collapse and/or may lose most of their performance benefits. Current standardized digital beamforming (explicit/implicit) may have a gain limited to around 2 decibels (dB).

In this approach an access point (AP) may try to detect different phases of arrival of a signal from a client on each of its array elements. In practice, the AP may not have an accurate and reliable impression of the client by measurement of signal arrival phase differences because of multiple reflections and refraction in an indoor environment. In implicit beamforming the phase differences may be used as phase differences that may be applied to an AP's antennas to achieve a maximum constructive mix of phases for the next transmission to that client. This method may have two flaws, particularly in future WLAN networks that suffer from higher levels of interference. First, uplink (client to AP) configurations may be used to manipulate signals in downlinks (AP to client). However, in reality, the signal behavior can differ significantly between uplink and downlink. Second, if the power measured on each antenna is contaminated by interference in a different location and at the same frequency, an estimate of the power correlation with directionality can be erroneous and false.

In order to address a first problem above, i.e. the problem of associating uplink receptions with downlink transmissions, a communication protocol, referred to as explicit beamforming, from the client to the AP is defined by the 802.11 committee. However, since this solution does not directly address the effect of erroneous CSI, due to interference and distance, the solution may suffer from the same problems as MIMO. That is, it may be very sensitive to interference and may provide sufficient performance only for shorter distances. In addition, the solution may require some changes in the client.

Several studies in indoor environments show that both analog and digital beamforming may collapse and suffer significant performance degradations. Further, the correlation between the physical direction and an effective direction may vary from environment to environment.

In a current state of the art there may be several vendors who use basic phase shift on omni-directional antennas to change a phase summation or subtraction in a certain location in space and improve signal to noise ratios. However, the solutions may not suppress interference and may not work in multiple user scenarios.

Other solutions may present switchable antenna elements but may eliminate the use of MIMO and thus in short range result in poor performance. In addition, their antenna elements may have poor front-to-back ratios, which may prohibit sufficient sectorization and interference suppression.

Disclosed herein are embodiments of a smart antenna platform capable of providing a MIMO or beamforming antenna pattern and capable of fast switching between the MIMO and beamforming operation. The smart antenna platform may include one or more BFAAs as disclosed herein. Each BFAA may be used to provide an omnidirectional pattern to provide MIMO capability. Also, signals from different BFAAs may be combined to provide a directional pattern to provide beamforming capability. Further, the smart antenna platform may comprise switching devices or circuits for quickly switching between a MIMO configuration and a beamforming configuration. The smart antenna platform may provide effective customization and real-time adaptation of an antenna array to indoor radio channels.

Figure 1:
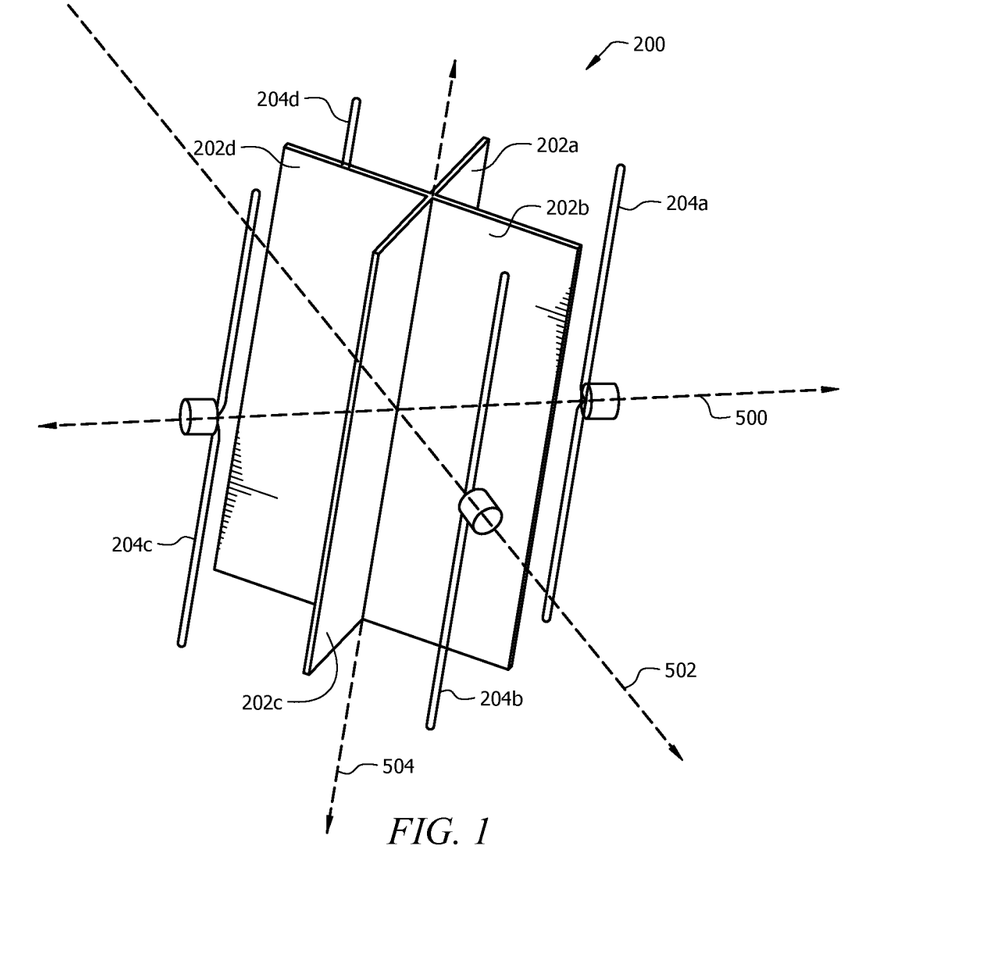
FIG. 1 is a perspective view of an embodiment of a beamforming antenna array (BFAA).
Figure 2:
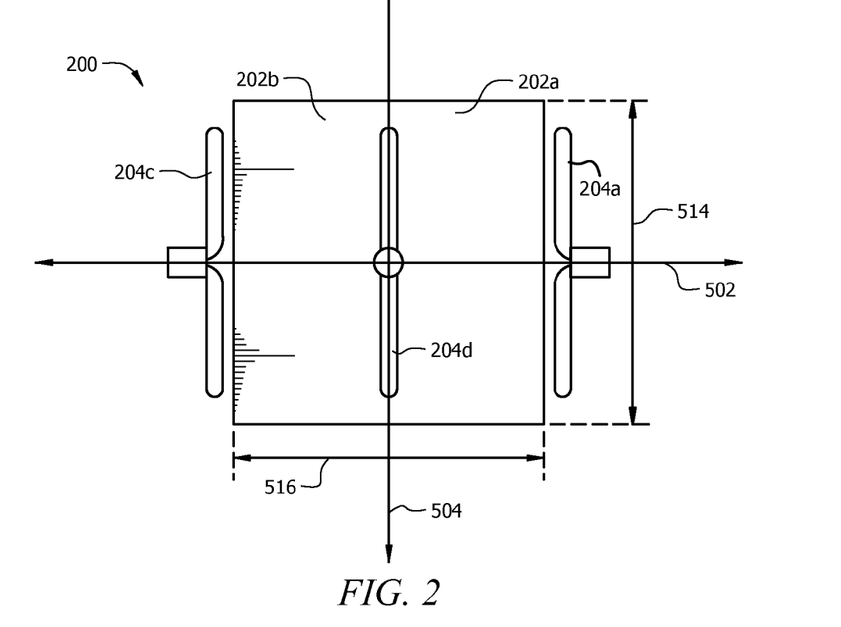
FIG. 2 is a side view of an embodiment of a BFAA.
Figure 3:
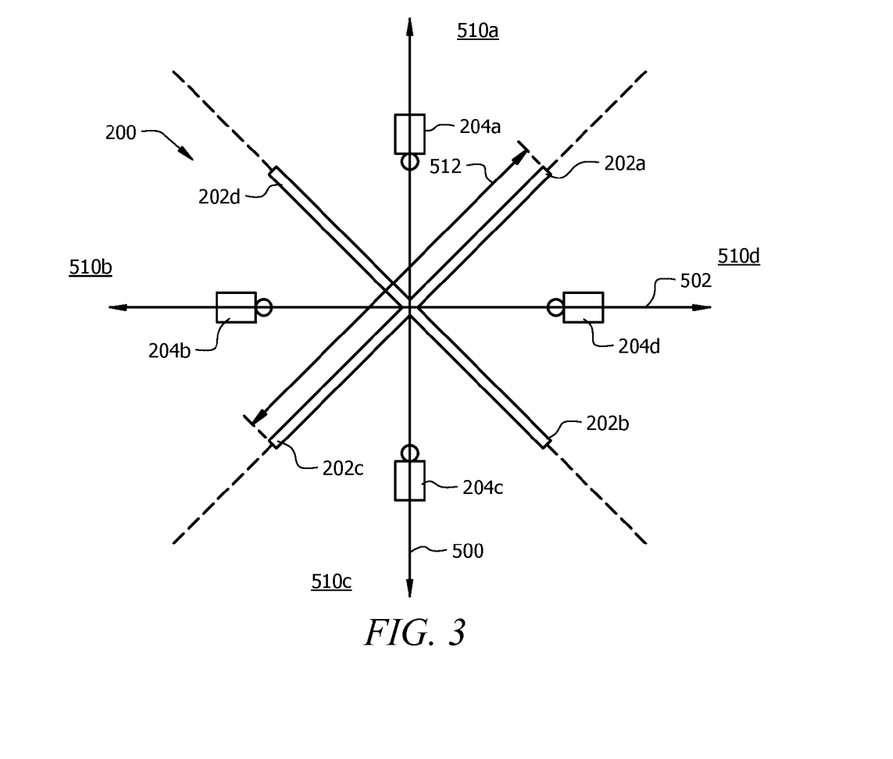
FIG. 3 is a top view of an embodiment of a BFAA.

Different perspective views of a BFAA 200 are presented in FIGS. 1, 2, and 3. The BFAA 200 may be a building block for a smart antenna platform The BFAA 200 may comprise a reflector 202 and a plurality of antenna elements 204 (e.g., antenna elements 204a-204d). In an embodiment, the reflector 202 may generally comprise a material suitable for reflecting at least a portion of a RF signal, for example, an RF signal transmitted by one or more antenna elements 204. For example, in an embodiment, the reflector 202 may generally comprise a solid metal surface and/or a wire metal surface, for example, a material formed of aluminum, copper, gold, any other suitable conductive material, as would be appreciated by one of ordinary skill in the art upon viewing this disclosure, or combination thereof. In an embodiment, the reflector 202 may comprise one or more folds and/or two or more segments (e.g., metal surfaces) joined along one or more edges of each of the segments. For example, in the embodiment of FIG. 1, the reflector 202 may comprise four solid metal surface segments (e.g., reflector segments 202a-202d) positioned about perpendicular (e.g., about 90 degrees) with respect to each other and may be joined along a common edge (e.g., along a vertical axis 504). In such an embodiment, as illustrated in FIG. 3, the reflector 202 (e.g., the reflector segments 202a-202d) may be configured to partition a horizontal plane (e.g., a plane defined by a first horizontal axis 500 and a second horizontal axis 502) into a plurality of sectors (e.g., sectors 510a-510d). In an alternative embodiment, a reflector may comprise 6 segments, 8 segments, 10 segments, 12 segments, or any other number of segments as would be appreciated by one of ordinary skill in the art upon viewing this disclosure. Additionally or alternatively, a reflector may span less than a complete circle, e.g. about 90 degrees, about 180 degrees, or about 270 degrees, or may span a complete circle, e.g. about 360 degrees. In embodiments, the reflector (e.g., the plurality of reflector segments) may further divide the horizontal plane into additional sectors, thereby increasing the resolution or granularity of the horizontal plane that can be addresses, as will be disclosed herein. Additionally in an embodiment, the reflector 202 structure and/or shape may be configured to be cylindrical, spherical, parabolic, or any other suitable shape as would be appreciated by one of ordinary skill in the art upon viewing this disclosure. In an embodiment, as shown in FIG. 3, the width of a cross section 512 of the reflector 202 may be about 50 millimeters (mm), 25 mm, 75 mm, 100 mm, or any other suitable width as would be appreciated by one of ordinary skill in the art upon viewing this disclosure. Additionally, as shown in FIG. 2, the height 514 of the reflector 202 may be about 64 mm, 32 mm, 75 mm, 100 mm, 200 mm, or any other suitable length as would be appreciated by one of ordinary skill in the art upon viewing this disclosure.

In an embodiment, the antenna elements 204 may be configured to transmit and/or to receive a RF signal (e.g., a WiFi signal) and to be responsive to one or more predetermined frequency bands. For example, the antenna elements 204 may be configured to be responsive to a RF signal (e.g., a WiFi signal) within a predetermined frequency band, for example, a frequency band as defined by the IEEE 802.11 standard (e.g., the 2.4-gigahertz (GHz) band or the 5 GHz band). In an additional or alternative embodiment, the antenna elements 204 may be configured to be responsive to any other suitable frequency band as would be appreciated by one of ordinary skill in the art upon viewing this disclosure. In an embodiment, the antenna elements 204 may generally comprise a monopole antenna, a dipole antenna, a folded dipole antenna, a patch antenna, a microstrip antenna, a loop antenna, an omnidirectional antenna, a planar inverted-F antenna (PIFA), a folded inverted conformal antenna (FICA), any other suitable type and/or configuration of antenna as would be appreciated by one of ordinary skill in the art upon viewing this disclosure, or combinations thereof. In the embodiments of FIGS. 1, 2, and 3, the BFAA 200 may generally comprise four dipole antenna elements 204a-204c. In an alternative embodiment, a BFAA may comprise any suitable number and/or type of antenna elements as would be appreciated by one of ordinary skill in the art upon viewing this disclosure. In an embodiment, for example as illustrated in FIG. 3, one or more antenna elements 204 (e.g., antenna elements 204a-204d) may be positioned within and/or substantially adjacent to one or more sectors (e.g., sectors 510a-510d) defined by the reflector 202, as previously disclosed. In an embodiment, as shown in FIG. 2, the antenna elements 204 may have a spacing 516 of about 62.5 mm, 31.5 mm, 20 mm, 75 mm, or any other suitable spacing as would be appreciated by one of ordinary skill in the art upon viewing this disclosure. Additionally, the antenna elements 204 and the reflector 202 may not be in direct contact with each other and may be separated by air. In an embodiment, the antenna elements 204 may be configured to be selectively activated and to be activated individually or in combination with two or more antenna elements. The antenna elements 204 are placed in close enough proximity to the reflector 202 to achieve the different antenna patterns discussed herein.

Figure 4:
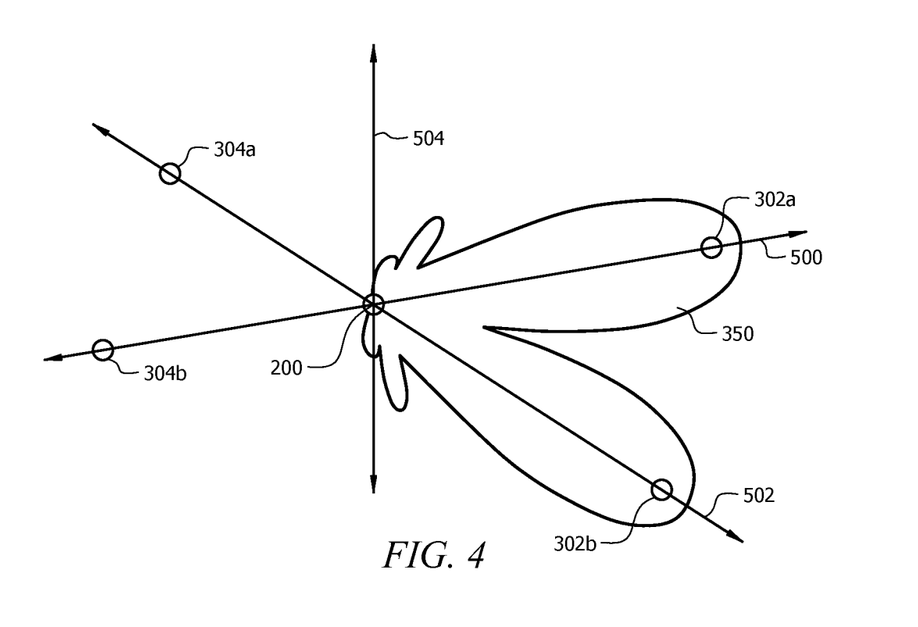
FIG. 4 is a perspective view of an embodiment of a BFAA radio frequency pattern.

In an embodiment, the BFAA 200 may be configured to adjust and/or to steer the antenna RF pattern of the BFAA 200, for example, for targeting one or more user devices or client devices. Beamforming methods are well known in the art, and any suitable beamforming method may be used herewith. In an embodiment, the BFAA 200 may be configured to activate one or more antenna elements 204 in conjunction with at least a portion of the reflector 202, thereby forming an antenna RF pattern or beam within one or more sectors (e.g., sectors 510a-510d) defined by the BFAA 200 and/or the reflector 202. For example, in the embodiment of FIG. 4, the BFAA 200 may be configured to adjust an antenna RF pattern 350 towards the direction of a first target user 302a and a second target user 302b. Additionally, in such an embodiment, the BFAA 200 may be configured to substantially suppress the antenna RF pattern 350 in the direction away from the target users 302a-302b and/or in the direction of one or more non-target users 304a-304b. The use of reflectors 202 may produce better results than similar systems lacking a reflector.

Figure 5:
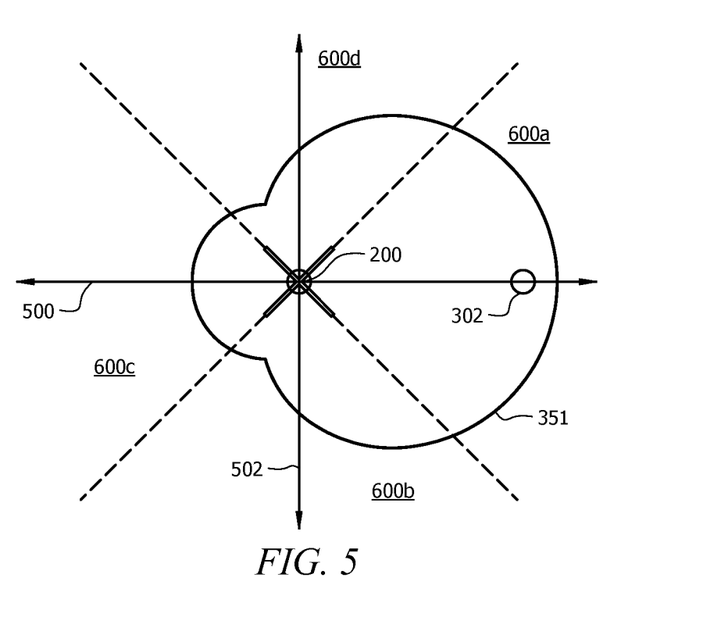
FIG. 5 is a top view of an embodiment of a BFAA communicating with a single user.
Figure 6:
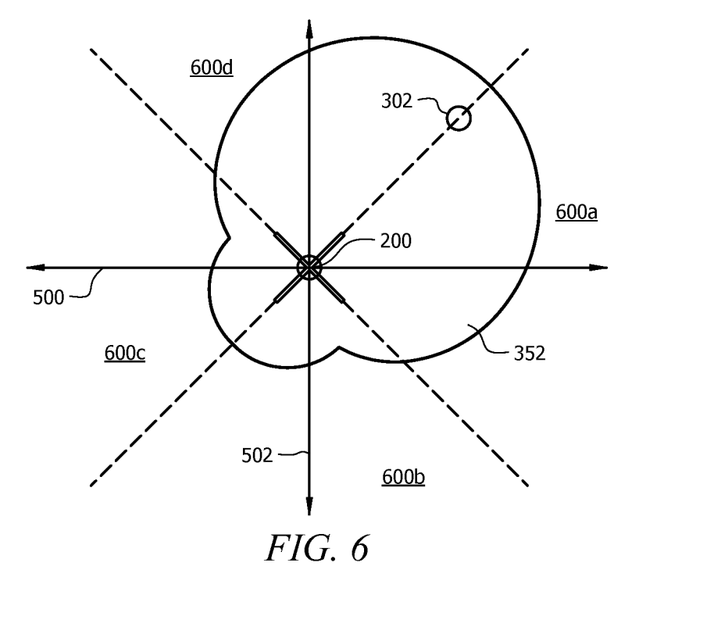
FIG. 6 is a top view of another embodiment of a BFAA communicating with a single user.
Figure 7:
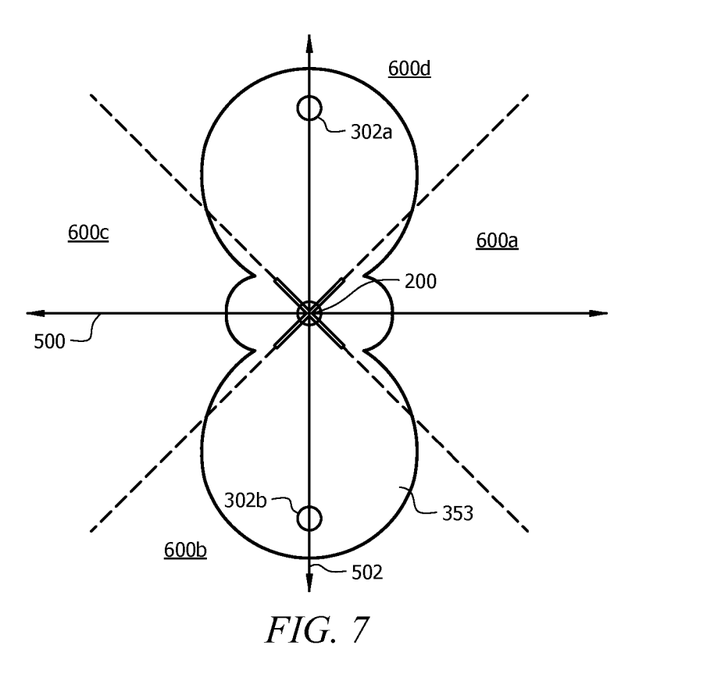
FIG. 7 is a top view of an embodiment of a BFAA communicating with two users.
Figure 8:
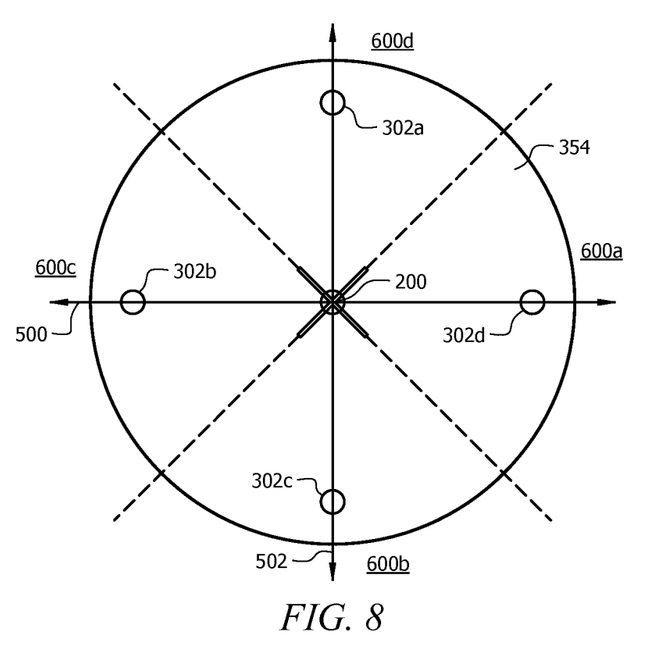
FIG. 8 is a top view of an embodiment of a BFAA communicating with four users.

In the embodiment of FIG. 5, the BFAA 200 is configured to activate a single sector (e.g., sector 600a) of the BFAA 200 and to form an antenna RF beam 351 in the general direction of one or more target users (e.g., target user 302). For example, the BFAA 200 may be configured to interface with a plurality of switches on the transceiver 104 such that the plurality of switches selectively activates (e.g., provides electrical communication between the BFAA 200 and the transceiver 104) one or more of the antenna elements 204. Additionally, in such an embodiment, the antenna RF beam 351 may be at least partially suppressed in one or more sectors (e.g., a second sector 600b, a third sector 600c, and a fourth sector 600d) where the target user is not located. For example, one or more of the switches on the transceiver 104 may not activate one or more of the antenna elements 204. In the embodiment of FIG. 6, the BFAA 200 is configured to activate two sectors (e.g., a first sector 600a and a second sector 600d) of the BFAA 200 and to form an RF antenna beam 352 in the general direction of one or more target users (e.g., target user 302). Additionally, in such an embodiment, the antenna RF beam 351 may be at least partially suppressed in one or more sectors (e.g., a third sector 600b and a fourth sector 600c) where the target user is not located. In the embodiment of FIG. 7, the BFAA 200 is configured to activate two non-neighboring sectors (e.g., a first sector 600d and a second sector 600b) of the BFAA 200 and to form an antenna RF beam 353 directed towards two target users (e.g., a first target user 302a and a second target user 302b). Additionally, in such an embodiment, the antenna RF beam 353 may be at least partially suppressed in one or more sectors (e.g., a third sector 600c and a fourth sector 600a) where the target users are not located. In the embodiment of FIG. 8, the BFAA 200 is configured to activate all of the sectors (e.g., a first sector 600a, a second sector 600b, a third sector 600c, and a fourth sector 600d) of the BFAA 200 and to form an antenna RF beam 354 directed towards a plurality of target users (e.g., the first target user 302a, the second target user 302b, the third target user 302c, and the fourth target user 302d). In an alternative embodiment, the BFAA 200 may be configured to activate any other suitable number and/or combinations of antenna elements as would be appreciated by one of ordinary skill in the art upon viewing this disclosure.

Figure 9:
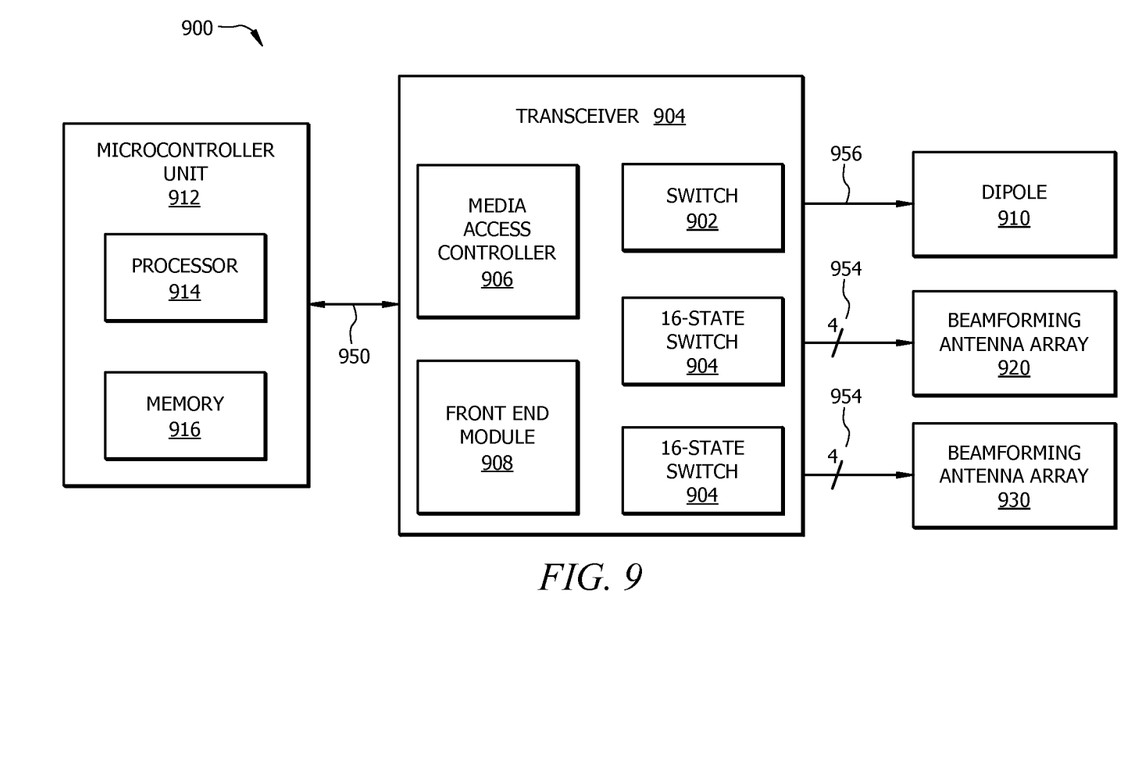
FIG. 9 is a schematic diagram of an embodiment of a wireless communication device.

FIG. 9 illustrates an embodiment of a wireless communication device 900 comprising a smart antenna platform. The wireless communication device 900 may be, for example, a wireless access point in a WLAN. The wireless communication device 900 may comprise a microcontroller unit (MCU) 912, a transceiver 904, a dipole antenna 910, two BFAAs 920, 930, a switch 902, and two 16-state switches 904, arranged as shown in FIG. 9. In such an embodiment, the wireless communication device 900 is configured to transmit and/or to receive a RF signal (e.g., a WiFi signal) (e.g., to/from one or more target users). Although FIG. 9 illustrates a particular embodiment in which a dipole 910 and BFAAs 920, 930 may be employed, a wireless communication device may employ any number of BFAAs and dipoles. Each of the two BFAAs 920, 930 may be configured as BFAA 200 described previously. For example, each of the two BFAAs 920, 930 may comprise four dipoles and reflector segments configured as shown in FIGS. 1-3. A first BFAA 920 may be configured with a first polarization (e.g., a vertical polarization), and a second BFAA 930 may be configured with a second polarization (e.g., horizontal polarization) substantially perpendicular to the first polarization. The different polarizations for BFAAs 920 and 930 may be readily achieved by one of skill in the art.

The wireless communication device 900 may activate at least one switch, such as switch 202 or 16-state switch 204, in order to make changes between the plurality of available antenna configurations. For example, the wireless communication device may select the antenna configuration best suited for a current operating environment. A 16-state switch 904 may control each of the four dipoles in a BFAA 920 or 930 via four-wire (or four-conductor) connection 954. Each of the four wires may correspond to each of the four dipoles of the BFAA 200. A "state" of a switch 904 may refer to whether a signal is placed on each conductor of 954. Therefore, a switch 204 is said to have 16 states corresponding to "off" or "on" (i.e., a communication signal transmitted) for each of the four wires of the four-wire connection 954. Note that the number of states of a 16-state switch in which at least one antenna of a BFAA is connected is 15, with the remaining state being one in which all antennas of a BFAA is disconnected. The switch 902 has only two states—"on" or "off" corresponding to whether or not a signal is transmitted via the dipole 910.

When the wireless communication device 900 decides to communicate in MIMO mode, each of BFAA 920 and 930 may be treated as single omni-directional antennas, with all four antennas in a BFAA transmitting the same signal, so that the overall pattern of a BFAA is omni-directional similar to that of a single dipole antenna. Also, the dipole 910 may be turned on thus yielding an inexpensive third antenna. Thus, in effect each BFAA 920 and 930, as well as dipole 910, has an omnidirectional antenna pattern, yielding a three-antenna (also known as a 3×3) MIMO configuration. When the wireless device 900 decides to communicate in beamforming mode, the dipole antenna 910 is turned off (e.g., via switch 902), and less than four of the dipole antennas of each BFAA 920 and 930 are activated (e.g., via corresponding switches 904) according to the desired antenna pattern.

When the communication device 900 is in MIMO transmission mode, one first data signal is transmitted using dipole 910, a second data signal is transmitted in each antenna of BFAA 920, and a third data signal is transmitted in each antenna of BFAA 930. The front end module 908 may replicate a second data signal for use by the 16-state switch 904. Similarly, the front end module 908 may replicate a third data signal for use by the other 16-state switch 904. The first, second, and third data signals may carry different data streams. When the communication device 900 is in beamforming transmission mode, the same data signal is transmitted from each of the antennas (e.g., dipole antennas if BFAAs 920 and 930 are that same as BFAA 200) of BFAAs 920 and 930 that are activated and operated as omni-directional antennas.

Suppose a signal is transmitted from another wireless device and the wireless communication device 900 is in receive mode to receive the signal. When the communication device 900 is in a MIMO receive mode, the dipole 910 may be activated (via switch 902) to receive the signal, the BFAA 920 may be activated (via one of the 16-state switches 904 that is placed in a state in which signals are received from all four wires 954) to receive the signal, and the BFAA 930 may be activated (via a second one of the 16-state switches 904 that is placed in a state in which signals are received from all four wires 954) to receive the signal. When the communication device 900 is in a beamforming receive mode, the dipole 910 may be deactivated by turning off the switch 902, the BFAA 920 may have a directional receive pattern by selectively receiving the signal via less than all four wires 954 by setting the 16-state switch 904 appropriately, and the BFAA 930 may have a directional receive pattern by selectively receiving the signal via less than all four wires 954 by setting the other 16-state switch 904 appropriately.

The wireless communication device 900 may comprise a plurality of functional units. In an embodiment, a functional unit (e.g., an integrated circuit (IC)) may perform a single function, for example, serving as an amplifier or a buffer. The functional unit may perform multiple functions on a single chip. The functional unit may comprise a group of components (e.g., transistors, resistors, capacitors, diodes, and/or inductors) on an IC which may perform a defined function. The functional unit may comprise a specific set of inputs, a specific set of outputs, and an interface (e.g., an electrical interface, a logical interface, and/or other interfaces) with other functional units of the IC and/or with external components. In some embodiments, the functional unit may comprise repeat instances of a single function (e.g., multiple flip-flops or adders on a single chip) or may comprise two or more different types of functional units which may together provide the functional unit with its overall functionality. For example, a microprocessor or a microcontroller may comprise functional units such as an arithmetic logic unit (ALU), one or more floating-point units (FPU), one or more load or store units, one or more branch prediction units, one or more memory controllers, and other such modules. In some embodiments, the functional unit may be further subdivided into component functional units. A microprocessor or a microcontroller as a whole may be viewed as a functional unit of an IC, for example, if the microprocessor shares circuit with at least one other functional unit (e.g., a cache memory unit).

The functional units may comprise, for example, a general purpose processor, a mathematical processor, a state machine, a digital signal processor, a video processor, an audio processor, a logic unit, a logic element, a multiplexer, a demultiplexer, a switching unit, a switching element an input/output (I/O) element, a peripheral controller, a bus, a bus controller, a register, a combinatorial logic element, a storage unit, a programmable logic device, a memory unit, a neural network, a sensing circuit, a control circuit, a digital to analog converter, an analog to digital converter, an oscillator, a memory, a filter, an amplifier, a mixer, a modulator, a demodulator, and/or any other suitable devices as would be appreciated by one of ordinary skill in the art. The wireless communication device 900 may comprise a plurality of distributed components and/or functional units and each functional unit may communicate with one or more other functional units via a suitable signal conduit, for example, via one or more electrical connections, as will be disclosed herein.

In an embodiment, the MCU 912 may be configured to control one or more functional units of the wireless communication device 900 and/or to control data flow through the wireless communication device 900. For example, the MCU 912 may be configured to communicate one or more electrical signals (e.g., data packets) with the transceiver 904 (e.g., via electrical connection 950) and/or to perform one or more processes on the electrical signals (e.g., authentication, packet monitoring logic, etc.). In such an embodiment, one or more of the processes may be performed in software, hardware, or a combination of software and hardware.

The MCU 902 may comprise a processor 914 and a memory 916. Although illustrated as a single processor, the processor 914 is not so limited and may comprise multiple processors. The processor 914 may be implemented as one or more CPU chips, cores (e.g., a multi-core processor), field-programmable gate arrays (FPGAs), application specific integrated circuits (ASICs), and/or digital signal processors (DSPs). The processor 914 may be configured to control the states of switches 954 and 956 to control the antenna pattern. For example, the processor 914 may control the switches 902 and/or 904 in order to switch on or off at least one of dipole 910, BFAA 920, or BFAA 930 such that the switched on arrangement generates a configuration of either beamforming or omnidirectional antenna patterns.

The memory 916 may be configured to store information (e.g., data) for the wireless communication device 900 and may be configured to read and/or to write data to one or more memory cells of the memory 916. In an embodiment, the memory 916 may comprise a read only memory (ROM), a random access memory (RAM), a flash memory, an external memory (e.g., a secure digital (SD) card), any suitable type of memory device as would be appreciated by one of ordinary skill in the art upon viewing this disclosure, or combinations thereof. In an embodiment, the transceiver 904 may be configured to conform to Institute of Electrical and Electronics Engineers (IEEE) 802.11 and/or 802.16 standards and/or protocols. In an additional or alternative embodiment, the transceiver 904 may be configured to conform to any other suitable standards and/or protocols as would be appreciated by one of ordinary skill in the arts upon viewing this disclosure.

The transceiver 904 may be configured to support and/or to provide wireless communications to/from the wireless communication device 900 (e.g., via the dipole 910, the BFAA 920, and/or the BFAA 930). In an embodiment, the transceiver 904 may generally comprise a media access controller (MAC) 906 and a front-end module (FEM) 908.

The MAC 906 may be configured to communicate an electrical signal (e.g., a data signal) with the MCU 902 (e.g., via an electrical connection 950) and to communicate a MAC layered data signal with the FEM 908 (e.g., via electrical connection 952). The MAC 906 may be configured to provide addressing and/or to provide channel access control mechanisms (e.g., for controlling data signal traffic). For example, the MAC 906 may be configured to implement a carrier sense multiple access (CSMA) protocol, a carrier sense multiple access with collision avoidance (CSMA/CA) protocol, a carrier sense multiple access with collision detection (CSMA/CD) protocol, a carrier sense multiple access with collision avoidance and resolution using priorities (CSMA/CARP) protocol, multiple access with collision avoidance (MACA) protocol, multiple access with collision avoidance for wireless (MACAW) protocol, a pure ALOHA protocol, a slotted ALOHA protocol, a reservation ALOHA (R-ALOHA) protocol, a mobile slotted ALOHA (MS-ALOHA) protocol, a dynamic time division multiple access (TDMA) protocol, a distributed coordination function (DCF), a point coordination function (PCF), a hybrid coordination function (HCF), or any other suitable media access protocol as would be appreciated by of ordinary skill in the art upon viewing this disclosure.

The FEM 908 may be configured to communicate a MAC layered data signal with the MAC 906 (e.g., via electrical connection 152) and to communicate one or more physical signals with the BFAA 200 (e.g., via electrical connection 954) or dipole 910 (e.g., via electrical connection 956). In an embodiment, the FEM 108 may be generally configured to filter an electrical signal (e.g., a MAC layered data signal), to amplify an electrical signal, to mix an electrical signal (e.g., up-convert an electrical signal or down-convert an electrical signal), to modulate an electrical signal, to control or configure an electrical current flow path (e.g., open or close one or more antenna switches), any other suitable signal processing as would be appreciated by one of ordinary skill in the art upon viewing this disclosure, or combination thereof. Additionally, in an embodiment, the FEM 908 may be configured to modulate an electrical signal, for example, to implement frequency hopping spread spectrum (FHSS) modulation, direct sequence spread spectrum (DSSS) modulation, orthogonal frequency division multiplexing (OFDM), high rate direct sequence spread spectrum (HR-DSSS), or any other suitable modulation technique as would be appreciate by one of ordinary skill in art upon viewing this disclosure.

In the embodiment of FIG. 9, the dipole 910, the BFAA 920, and/or 930 may be configured to interface and/or to couple to the transceiver 904 and/or FEM 908 (e.g., via electrical connections 952 and/or 954) and to receive and/or to transmit a RF signal (e.g., WiFi signal) to/from the wireless communication device 900. Additionally, in such an embodiment, the antenna RF beam 351 may be at least partially suppressed in one or more sectors (e.g., a second sector 600b, a third sector 600c, and a fourth sector 600d) where the target user is not located. For example, one or more of the switches on the transceiver 904 may not activate one or more of the antenna elements 904.

The antenna configuration for the communication device 900 may provide polarization diversity and spatial diversity (if dipole 910, BFAA 920, and BFAA 930 are spaced far enough apart from each other).

Figure 10:
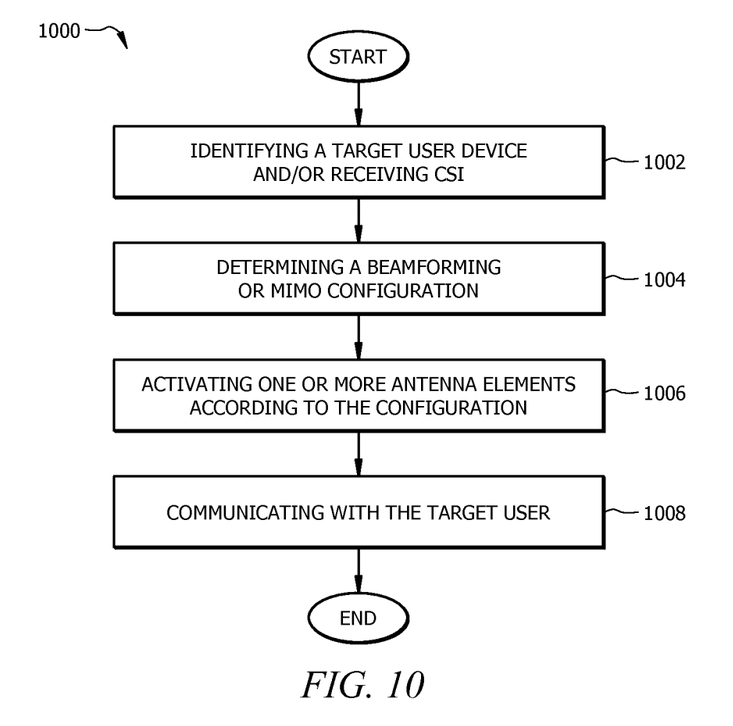
FIG. 10 is a flow chart of an embodiment of an antenna configuration selection method.

FIG. 10 is a flow chart of an embodiment 1000 of an antenna configuration selection method. As illustrated in FIG. 10, the embodiment 1000 may generally comprise the steps of identifying one or more target users 1002, determining a beamforming or MIMO configuration 1004, activating one or more antenna elements according to the determined configuration 1006, and communicating with the target user 1008.

When identifying the target user device 1002, a communication device (e.g., WLAN AP) comprising a BFAA, such as BFAA 200, may be provided to a location having one or more wireless broadband user devices (e.g., WiFi users), for example, the communication device and/or the BFAA 200 may be provided to a business center, an office, a hotel, a hospital, a university, and/or any other suitable location as would be appreciated by one of ordinary skill in the art. In such an embodiment, one or more of the user devices may be authorized to access the communication device. For example, one or more of the user devices may be able to provide and/or to transmit an authentication signal (e.g., a password or a passkey).

When determining an antenna configuration 1004, a BFAA may scan the surrounding environment to identify and/or to locate one or more authorized users. For example, the WLAN device may scan (e.g., activate) each of the sectors of the BFAA, for example, to interrogate a user and/or to listen for an RF signal (e.g., an authentication signal), thereby identifying one or more authorized target users and the relative location of the one or more authorized target users with respect to the BFAA. The WLAN device may also detect the location of one or more interferers, and determine an estimated distance to the target user, e.g., based on signal to interference plus noise ratio (SINR) measurements. Based on this information, the communication device may determine that a beamforming or a MIMO configuration is a best communication configuration. For example, if the interference is significant, a beamforming configuration may be desirable, whereas if the range is small, a MIMO configuration may be desirable.

When activating one or more antenna elements 1006, the communication device may configure the BFAA such that an antenna RF beam is formed in one or more sectors of the BFAA in the general direction of the one or more authorized target users. For example, referring again to FIG. 4, the BFAA 200 activates one or more antenna elements 204 in conjunction with at least a portion of the reflector 202, thereby forming the antenna RF beam, as previously disclosed. Additionally, in such an embodiment, the communication device may further configure the BFAA to substantially suppress an antenna RF beam in one or more sectors of the BFAA not having an authorized target user. Alternatively, when activating one or more antenna elements 1006, the communication device may configure the BFAA to operate in an omni-directional mode, and the communication device may further configure a second BFAA and/or a single dipole antenna to operate in an omni-directional mode thereby providing 3×3 MIMO capability.

When communicating with the target user 1008, following the formation of the antenna RF beam in the general direction of the one or more authorized target users, the communication device and/or the BFAA may establish a communication channel with the authorized user, for example, via a CSMA protocol. In such an embodiment, following the establishing of the communication channel, the communication device may communicate (e.g., transmit and/or receive) an RF signal with the one or more authorized target users. For example, the communication device may communicate a plurality of data packets with the one or more authorized target user via the BFAA.

In an embodiment, the process of identifying one or more target users, determining an antenna configuration, activating one or more antenna elements, and communicating with the target users may be repeated. For example, in a manner similar to that disclosed herein, the BFAA 200 may be reconfigured to form an alternative antenna RF beam in the generally direction of the authorized target users.

The method 1000 may be implemented in a communication device, such as communication device 900 in FIG. 9. For example, the transceiver 904 may be configured to coordinate with the MCU 912 to perform step 1002. The processor 914 may be configured to perform step 1004 based on information received in step 1002. The switches 902 and 904 may be configured to perform step 1006, and the wireless device 900 may be configured to perform step 1008 once the states of switches 902 and 904 are set.

The antenna architectures presented herein may provide the following benefits.

(1) Real-Time Adaptation of Beamforming Patterns to Indoor Scenarios:

Through introduction of a smart antenna platform that may switch between various beamforming configuration options at a very fast pace, an optimal antenna beam may be selected based on various criteria such as SINR.

(2) Cost Effective and Fast Switching Between MIMO and Beamforming:

An antenna architecture is presented than may electronically change antenna patterns to best match with MIMO.

(3) Interference Mitigation and Multi-User Environment:

An antenna architecture is presented that may be reconfigurable based on the interference and user physical location, power, and frequency use.

(4) A Beamforming/Adaptive Antenna Array:

An antenna architecture is presented that may be capable of adapting its three-dimensional radiation pattern to introduce nulls to interferences, and maximal directivity to desired users.

(5) Broad Range of Environments:

Unlike conventional beamforming, which may work well only in outdoor environments, an antenna architecture is presented that may provide adequate coverage for multiple users, multiple interfering signals, either in indoor or outdoor environments.

(6) Diversity Gain:

An antenna architecture is presented that may offer diversity in three ways—polarization diversity, spatial diversity, and space diversity, which may provide the best link in any interference and multipath scenario.

(7) Other Benefits Include:

An antenna architecture is presented that may have the ability to listen to the environment in an omni-directional sense and then adapt its pattern accordingly. An antenna configuration may be selected based on range and effectiveness. For example, MIMO may be applied for short range communication, and adaptive beamforming may be applied for medium range and long range communication. In each scenario, the best configuration may be selected.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
a first dipole antenna;
a beamforming antenna array (BFAA);
a first switch coupled to the dipole antenna;
a second switch coupled to the BFAA; and
a processor coupled to the first switch and the second switch, wherein the processor is configured to:
select between a multi-input, multi-output (MIMO) antenna configuration and a beamforming configuration by setting the states of the first switch and the second switch, wherein when the MIMO antenna configuration is selected, the dipole antenna is turned on, and all antennas of the BFAA are turned on to make the BFAA to work as an omni-directional antenna, and wherein when the beamforming configuration is selected, the dipole antenna is turned off, at least one of the antennas of the BFAA is turned off, and at least one of the antennas of the BFAA is turned on.

2. The apparatus of claim 1, wherein the BFAA comprises a reflector and four antennas, wherein the second switch is a 16-state switch, wherein the apparatus further comprises a first set of four conductors coupling the second switch to the four antennas of the BFAA, wherein the BFAA has a substantially omni-directional antenna pattern when the 16-state switch turns on the four antennas, and wherein the BFAA has a beamforming pattern when the 16-state switch turns off at least one of the four antennas.

3. The apparatus of claim 2, wherein the processor selects a MIMO configuration by having the first switch turn on the first antenna and by having the second switch turn on the four antennas of the BFAA, and wherein the processor selects a beamforming configuration by having the first switch turn off the first antenna and the second switch turn off at least one of the four antennas of the BFAA.

4. The apparatus of claim 3, further comprising a second BFAA, wherein the BFAA is configured to provide a first polarization, wherein the second BFAA is configured to provide a second polarization, and wherein the first polarization is substantially perpendicular to the second polarization.

5. The apparatus of claim 4, further comprising a third switch coupled to the second BFAA, wherein the third switch is a second 16-state switch, wherein the second BFAA comprises a second reflector and a second set of four antennas, wherein the apparatus further comprises a second set of four conductors coupling the second switch to the four antennas of the second BFAA, wherein the second BFAA has a substantially omni-directional antenna pattern when the second 16-state switch turns on the second set of four antennas, and wherein the second BFAA has a beamforming pattern when the second 16-state switch turns off at least one of the second set of four antennas.

6. The apparatus of claim 4, wherein the BFAA and the second BFAA are configured such that their beamforming patterns are directed towards a target user device for given states of the 16-state switch and the second 16-state switch.

7. The apparatus of claim 6, wherein the antennas of the BFAA and the second BFAA are one of dipole antennas, monopole antennas, or patch antennas.

8. A method comprising:
identifying a target user device;
determining whether to use a beamforming or multiple-input multiple-output (MIMO) configuration for an apparatus;
making, when the MIMO configuration is applied, a dipole antenna and all antennas of a beamforming antenna array (BFAA) to be activated, wherein the dipole antenna and the BFAA are in the apparatus;
making, when the beamforming configuration is applied, at least one antenna of the BFAA to be activated, and the dipole antenna and at least one of antenna of the BFAA to be inactivated; and
communicating with the target user device by transmitting data using the beamforming or MIMO configuration.

9. The method of claim 8, wherein the BFAA comprises four antennas and a reflector, wherein a 16-state switch is coupled to the BFAA via a first set of four conductors coupling the 16-state switch to the four antennas of the BFAA, wherein the BFAA has a substantially omni-directional antenna pattern when the 16-state switch turns on the four antennas, and wherein the BFAA has a beamforming pattern when the 16-state switch turns off at least one of the four antennas.

10. The method of claim 9, wherein the dipole antenna and the four antennas of the BFAA are activated to achieve the MIMO configuration, and wherein the dipole antenna and at least one of the four antennas of the BFAA are deactivated for the beamforming configuration.

11. The method of claim 10, further comprising activating one or more antennas in a second BFAA according to the determined configuration, wherein the second BFAA comprises a second reflector and a second set of four antennas.

12. The method of claim 11, wherein the BFAA is configured to provide a first polarization, wherein the second BFAA is configured to provide a second polarization, and wherein the first polarization is substantially perpendicular to the second polarization.

13. A wireless communication device comprising:
an antenna platform comprising:
a dipole antenna;
a first beamforming antenna array (BFAA); and
a second BFAA;
a transceiver coupled to the antenna platform; and
a processor coupled to the transceiver, wherein the processor is configured to:
select a beamforming configuration or a multiple-input multiple-output (MIMO) configuration of the antenna platform;
make a dipole antenna and all antennas of the first beamforming antenna array (BFAA) to be activated when the MIMO configuration is applied; and make at least one antenna of the first BFAA to be activated, and the dipole antenna and at least one of antenna of the BFAA to be inactivated when the beamforming configuration is applied.

14. The wireless communication device of claim 13, wherein the transceiver comprises:
    a first switch coupled to the dipole antenna;
    a first 16-state switch coupled to the first BFAA; and
    a second 16-state switch coupled to the second BFAA,
    wherein controlling the transceiver comprises setting the states of the first switch, the first 16-state switch, and the second 16-state switch.

15. The wireless communication device of claim 14, wherein the first BFAA comprises a first set of four antennas and a first reflector, wherein the second BFAA comprises a second set of four antennas and a second reflector, wherein the wireless communication device further comprises:
    a first set of four conductors coupling the first 16-state switch to the first set of four antennas; and
    a second set of four conductors coupling the second 16-state switch to the second set of four antennas,
    wherein the processor selects a MIMO configuration by having the first switch turn on the dipole antenna, by having the first 16-state switch turn on the first set of four antennas, and by having the second 16-state switch turn on the second set of four antennas, and wherein the processor selects a beamforming configuration by having the first switch turn off the dipole antenna, by having the first 16-state switch turn off at least one of the four antennas of the first BFAA, and by having the second 16-state switch turn off at least one of the four antennas of the second BFAA.

16. The wireless communication device of claim 14, wherein the first BFAA and the second BFAA are configured such that their beamforming patterns are directed towards a target user device for given states of the first 16-state switch and the second 16-state switch.

17. The wireless communication device of claim 13, wherein the first BFAA is configured to provide a first polarization, wherein the second BFAA is configured to provide a second polarization, and wherein the first polarization is substantially perpendicular to the second polarization.

18. The wireless communication device of claim 15, wherein the antennas of the first BFAA and the second BFAA are one of dipole antennas, monopole antennas, or patch antennas.

* * * * *